(12) United States Patent  
Helms et al.

(10) Patent No.: US 8,354,921 B2  
(45) Date of Patent: Jan. 15, 2013

(54) SELF-ILLUMINATING HANDLE FOR A VEHICLE EMERGENCY EGRESS ASSEMBLY

(75) Inventors: James M. Helms, Fort Myers, FL (US); Michael L. Hafften, Loretto, MN (US)

(73) Assignee: Ibis Tek, LLC, Butler, PA (US)

( * ) Notice: Subject to any disclaimer, the term of this patent is extended or adjusted under 35 U.S.C. 154(b) by 162 days.

(21) Appl. No.: 12/802,135

(22) Filed: May 28, 2010

(65) Prior Publication Data

US 2011/0291849 A1    Dec. 1, 2011

(51) Int. Cl.  
*B60Q 1/00* (2006.01)

(52) U.S. Cl. ..... 340/438; 340/436; 340/540; 296/146.1; 296/1.02

(58) Field of Classification Search ................ 340/669, 340/540, 689, 693.5, 463, 436, 438; 296/146.1, 296/1.02  
See application file for complete search history.

(56) References Cited

U.S. PATENT DOCUMENTS

| 6,851,820 | B2 * | 2/2005 | Choi et al. ................ 362/92 |
| 6,859,145 | B2 * | 2/2005 | Wilker et al. ............ 340/693.5 |
| 8,066,319 | B2 * | 11/2011 | Hafften et al. ............ 296/146.1 |
| 2006/0125616 | A1 * | 6/2006 | Song ....................... 340/463 |
| 2011/0160966 | A1 * | 6/2011 | Witte ....................... 701/45 |

* cited by examiner

*Primary Examiner* — Albert Wong  
*Assistant Examiner* — Peter Mehravar  
(74) *Attorney, Agent, or Firm* — Karen Tang-Wai Sutton

(57) ABSTRACT

A self-illuminating handle assembly for a release mechanism of an emergency egress system for a vehicle. The handle assembly includes a sensor for sensing a predetermined condition and providing a sensor signal in response thereto, and a sensor-activated switch assembly for causing the handle assembly to self-illuminate in response to the sensor signal. The sensor could be a so-called tilt sensor for sensing when the vehicle orientation is tilted beyond a threshold tilt orientation, or an acceleration sensor (accelerometer) for sensing when the vehicle has undergone an acceleration or deceleration beyond a threshold, indicative of a crash or the vehicle having been exposed to an explosion.

4 Claims, 4 Drawing Sheets

SELF-ILLUMINATING HANDLE FOR A VEHICLE EMERGENCY EGRESS ASSEMBLY

FIELD OF THE INVENTION

The present invention relates to an emergency egress assembly for a vehicle, and more particularly to a self-illuminating handle for such an emergency egress assembly.

BACKGROUND OF THE INVENTION

Increased armoring ("up-armoring") of the HMMWV (commonly known as HumVee) and other light tactical military vehicles to provide an increased level of soldier protection has resulted in an upward shift in the vehicles' center of gravity (CG), making them prone to roll or tip over during evasive maneuvering, off-road travel and IED/RPG (improvised explosive device/rocket propelled grenade) attack. When an up-armored vehicle rolls over, many times the crew cannot egress via the doors due to the weight of the armor on the doors, or jamming of doors from the vehicle frame twisting. The gunner's station is not an option for exit either if the vehicle is upside down. The result is that the crew is often killed due to vehicle fires, follow-up insurgent attacks, trauma injuries and drowning. To further complicate matters, a rollover during a night time operation makes it difficult for the crew to quickly locate any emergency egress system inside the vehicle.

In some cases an armored vehicle, whether up-armored or instead armored by original design, may crash or be attacked and not roll over, and yet the crew may find itself in poor visibility conditions, and so unable to quickly locate any emergency egress system and operate its release mechanism.

There is therefore a need for an improved emergency egress system for armored (ground) vehicles, an egress system that is designed to help the crew locate it in conditions of poor visibility caused by a rollover or a high acceleration or deceleration event, such as a crash or an IED or RPG attack.

SUMMARY OF THE INVENTION

Accordingly, the invention provides a handle assembly for a vehicle emergency egress assembly, such as the assembly described in U.S. Pat. No. 8,066,319, which by this reference is incorporated in its entirety, the handle assembly comprising: a handle body; a light source affixed to the handle body; a power source affixed to the handle body; and a sensor-activated switch assembly, including a switch operably coupled to the power source and to the light source for switching on the light source by providing a connection to the power source, and a sensor operably connected to the switch, for sensing a predetermined condition and for providing a sensor signal to the switch in response to sensing the predetermined condition; wherein the switch switches on the light source in response to the sensor signal.

In some embodiments, the sensor is a tilt sensor configured to provide a sensor signal to turn on the light source in case of tilting by more than a predetermined threshold, and in some configurations the sensor is an accelerometer configured to provide a sensor signal to turn on the light source in case of accelerating or decelerating by more than a predetermined threshold.

BRIEF DESCRIPTION OF THE DRAWINGS

The above and other objects, features and advantages of the invention will become apparent from a consideration of the subsequent detailed description presented in connection with accompanying drawings, in which.

DRAWINGS LIST OF REFERENCE NUMERALS

Figure 1:
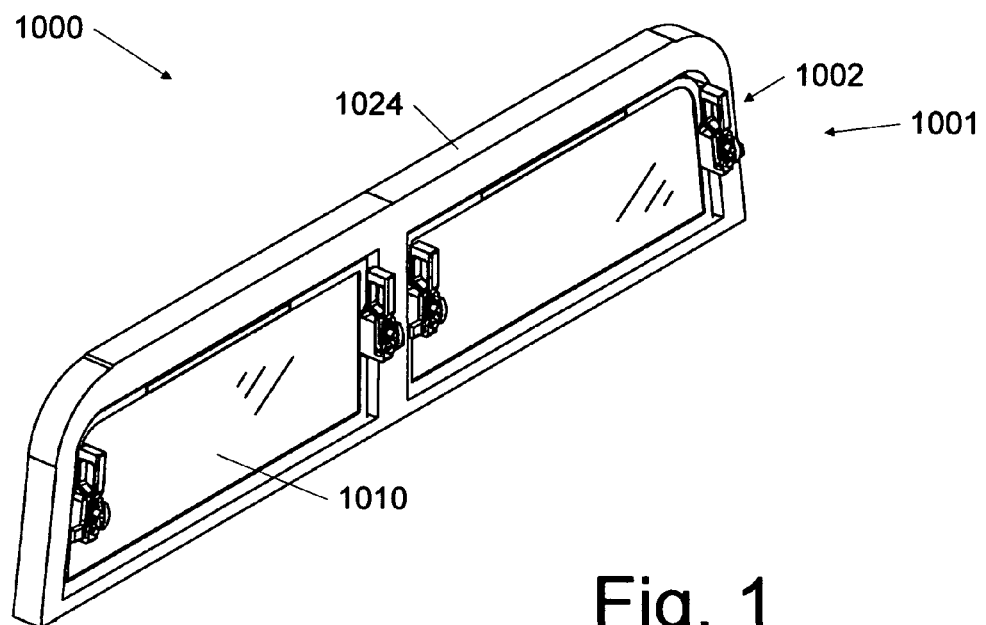
FIG. 1 is a perspective view of an embodiment of a portion of a vehicle emergency egress assembly (a kick out armored window) having a release mechanism including a plurality of handles for operating the release mechanism, each of which handles could be provided according to the invention.
Figure 2:
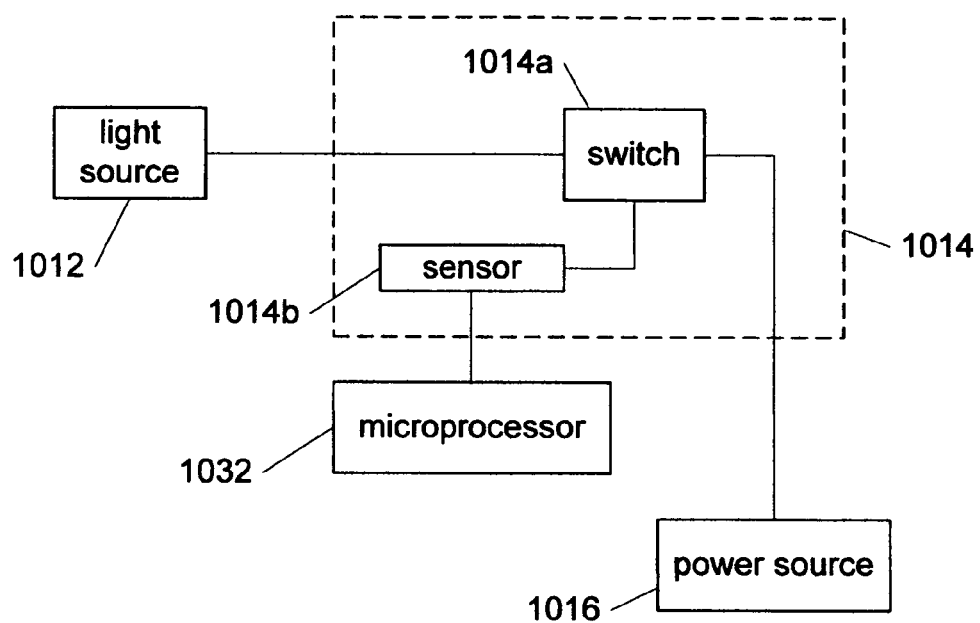
FIG. 2 is a block diagram of components of the invention typically embedded in or attached to a handle used to operate a release mechanism of a vehicle emergency egress assembly, and configured to cause the handle to self-illuminate under certain pre-determined conditions.

The following is a list of reference labels used in the drawings to label components of different embodiments of the invention, and the names of the indicated components.

| | |
|---|---|
| 1000 | components of a vehicle emergency egress assembly |
| 1001 | components of a release mechanism |
| 1002 | handle assembly |
| 1002a | handle body |
| 1006 | aperture |
| 1010 | transparent armor pane |
| 1012 | light source |
| 1014 | sensor activated switch assembly |
| 1014a | switch |
| 1014b | sensor |
| 1016 | power source |
| 1018 | latch |
| 1020 | pin |
| 1024 | window housing |
| 1032 | microprocessor |

DETAILED DESCRIPTION

Referring now to FIGS. 1-4, the invention provides a self-illuminating handle assembly 1002 including a handle body 1002a in which a power source 1016 provides power to a light-source 1012 under the control of a sensor-activated switch assembly 1014. The sensor-activated switch assembly includes a sensor 1014b, for providing a sensor signal in case of a pre-determined sensed condition, and a switch 1014a, for establishing a connection between the light source and the power source in response to the sensor signal.

Figure 3:
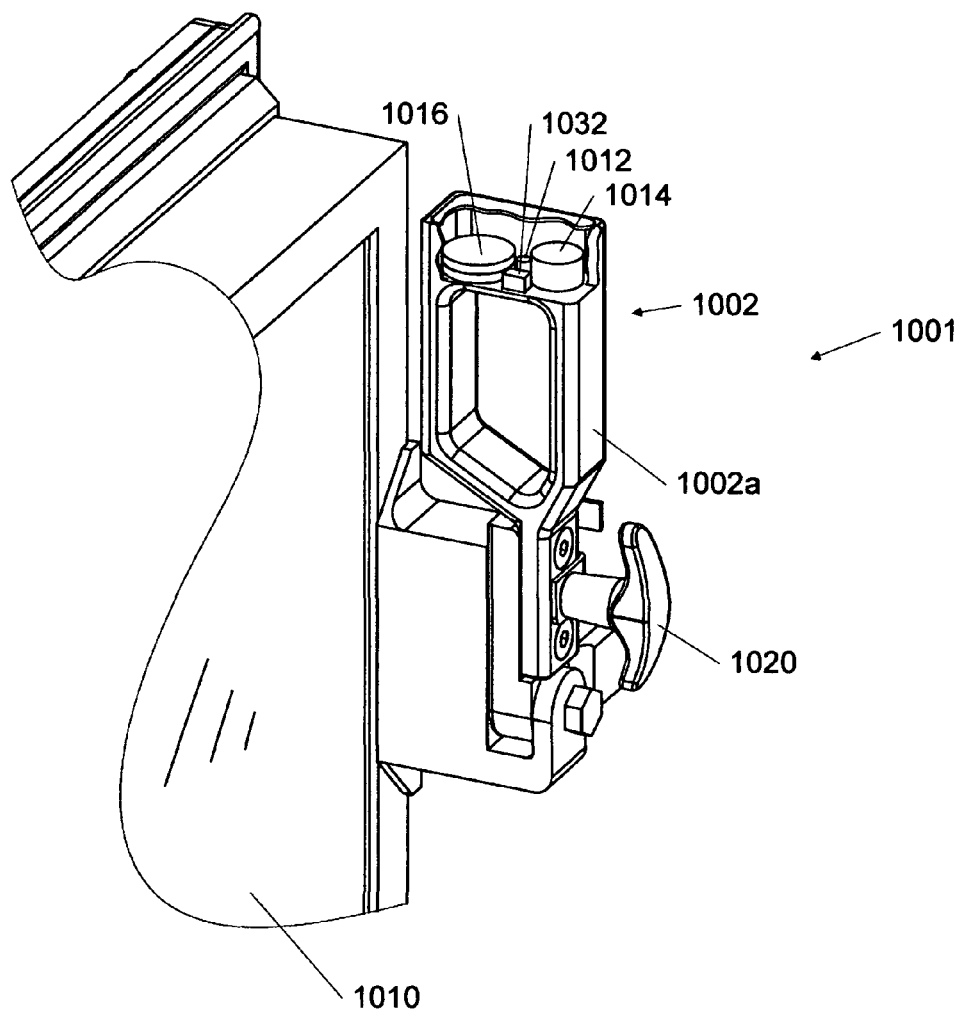
FIG. 3 is perspective view of a self-illuminating handle according to the invention for use with the release mechanism shown in FIG. 1, showing a cutaway view of the internal electronics housed inside the handle.
Figure 4:
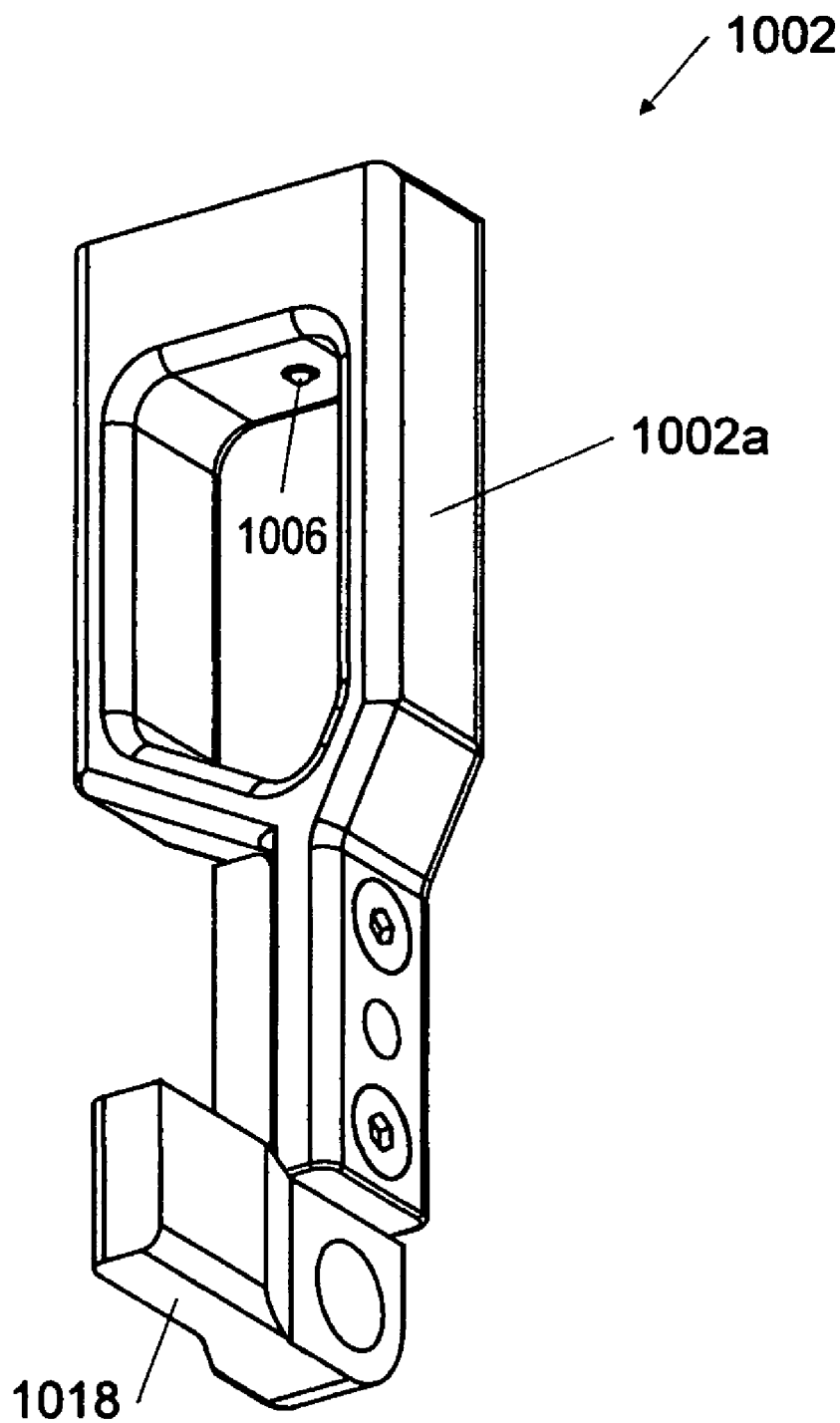
FIG. 4 is a perspective view of the self-illuminating handle of FIG. 3, showing the aperture through which light from a light source is emitted under pre-determined conditions, so that the handle becomes self-illuminating.

Advantageously, and as shown in FIGS. 3 and 4, the light source, power source, and sensor-activated switch assembly are embedded in the handle body, and an aperture 1006 is provided through which light from the light source may be emitted, so that the handle assembly is self-illuminating (as triggered by the sensor-activated switch).

The sensed condition could be a tilting of more than a predetermined threshold, in which case the sensor would a so-called tilt sensor, or the sensed condition could be an acceleration of deceleration by more than a pre-determined threshold, in which case the sensor would be an accelerometer. In some embodiments, both types of sensors would be used, each able to signal the switch to turn on.

FIG. 1 shows a portion 1000 of a vehicle emergency egress assembly according to the incorporated U.S. Pat. No. 8,066, 319, including a portion of the release mechanism 1001 therefor. The portion 1000 of the vehicle emergency egress assembly includes two transparent armor panes 1010 releasably secured in a window housing 1024 by the release mechanism (not shown in its entirety).

Referring now to FIG. 3, when a vehicle occupant pulls the release pin 1020 locking each handle assembly in an engaged position, and then rotates or pivots each handle assembly 1002, latches 1018 (FIG. 4) are rotated away from latch receivers (not shown) mounted on the interior wall of the vehicle, allowing the transparent armor panes 1010 to fall outward or to be pushed outward, away from the vehicle, providing an egress portal.

A handle assembly according to the invention could be used or each handle assembly of a release mechanism for an armored vehicle emergency egress assembly of any sort. Thus, a handle assembly according to the invention is envisioned for use with an emergency hatch, as well as for a vehicle emergency egress window assembly such as shown and described in the incorporated U.S. Pat. No. 8,066,319.

The light source 1012 is typically a light-emitting diode, but any other suitable light source may be used. The power source is typically a battery (plurality of cells) or a single cell, although any other suitable power source can be used.

As mentioned, the sensors 1014b are preprogrammed to sense a predetermined condition, for instance, an impact from a crash, a blast from an IED, or other similar high acceleration events, or a rollover or tip over of the vehicle, regardless of how that rollover or tip over is caused. When the sensor senses the predetermined condition, it sends a signal to a switch 1014a coupled to the sensor, which then turns on power to the light source. The light source illuminates the handle body 1002a, and since the light source is a part of the handle assembly 1002, the handle assembly thereby becomes self-illuminating, aiding the vehicle occupants to find the handle needed to operate the release mechanism.

In some embodiments, and in particular in case of use of a tilt-sensor, the handle assembly 1002 also includes a microprocessor 1032 (FIGS. 2 and 3) programmed to prevent the sensor from sending a signal to illuminate when such a signal is really not desired. For example, a vehicle may be operating on rough and uneven terrain, and during such operation tilting is sensed, but the tilting is only momentary. The microprocessor is programmed to wait delay turning on for a predetermined time, and not to turn on if the predetermined condition does not persist for longer than the predetermined time.

In addition, the microprocessor 1032 can be programmed for different flash patterns, such as a blinking light to indicate low battery power. Also, the microprocessor can be programmed to keep the switch 1014b in the on position either for only a predetermined length of time, or instead indefinitely, once the sensor 1014b senses the relevant predetermined condition.

As mentioned, FIG. 3 shows a cutaway view of the light source and other components of the handle assembly 1002, embedded within a cavity provided in the handle body 1002a. The light source is shown oriented so that the light-emitting portion, when turned on, is visible through the aperture 1006 cut into the handle body (FIG. 4).

In the embodiments shown in FIGS. 1-4, a handle assembly is shown for use with a particular sort of release mechanism, for a particular vehicle emergency egress assembly. It should be appreciated from what has been described, though, that the invention is not to be limited to a particular shape of handle or way in which it is used to operate a release mechanism. The invention applies equally well to a handle assembly having a handle that is, for example, pulled or pushed, as well as one that is turned or pivoted. As another example, a handle assembly operated as a lever could also be provided according to the invention.

It is to be understood that the arrangements shown and described above and in the attachments are only illustrative of the application of the principles of the present invention, and while the embodiments shown in the figures and in the description relate to a military-use vehicle, the invention is capable of being used in any armored (ground) vehicle, as an additional safety feature. Numerous modifications and alternative arrangements may be devised by those skilled in the art without departing from the scope of the present invention, and the appended claims are intended to cover such modifications and arrangements.

What is claimed is:

1. A handle assembly for a vehicle emergency egress assembly located inside a vehicle occupant compartment, the vehicle emergency egress assembly further comprising an egress structure and a release assembly affixed to the egress structure, the release assembly further comprising a frame having at least one frame aperture sized to receive a fastener, and a release handle having a handle aperture, the release handle removably affixed to the frame by a fastener inserted into both the frame aperture and the handle aperture, the handle assembly suitable for replacing the release handle, the handle assembly comprising:
   a handle body;
   at least one aperture in the handle body sized to receive the fastener, the handle body removably affixed to the frame by the fastener secured into both the at least one aperture in the handle body and the frame aperture;
   a light source affixed to the handle body;
   a non-replaceable battery power source affixed to the handle body; and
   a sensor-activated switch assembly, including a switch operably coupled to the battery power source and to the light source, and a sensor operably connected to the switch, the sensor for sensing an event or a crash or other emergency rendering the vehicle inoperable and providing a sensor signal to the switch in response to sensing the predetermined condition;
   wherein the handle body, the light source, the battery power source, and the sensor-activated switch assembly form a self-contained, non-serviceable unit;
   wherein the light source and the sensor-activated switch assembly are both powered solely by the battery power source;
   wherein the switch switches on the light source in response to the sensor signal; and
   wherein once the switch switches on the light source, the light source remains illuminated regardless of any subsequent change in the predetermined condition sensed by the sensor,
   whereby occupants inside the vehicle compartment can visually locate the illuminated handle assembly affixed to the egress structure in the event of a crash or other emergency rendering the vehicle inoperable, allowing the occupants to exit the vehicle compartment and move to safety, and
   whereby the handle assembly, once illuminated, is discarded and replaced by a new handle assembly.

2. A handle assembly as in claim 1, wherein the sensor is a tilt sensor, configured to provide the sensor signal in response to sensing a tilting of the handle assembly beyond a predetermined threshold tilted orientation sustained beyond a predetermined length of time.

3. A handle assembly as in claim 1, wherein the sensor is an acceleration sensor, configured to provide the sensor signal in response to sensing an acceleration or deceleration of the handle assembly beyond a predetermined threshold acceleration or deceleration sustained beyond a predetermined length of time.

4. A handle assembly as in claim 1, wherein the handle assembly has an exterior surface covering a partially hollow core, and has an aperture leading from the core to the exterior surface, and wherein the light source includes a light-emitting portion and is disposed in the hollow core of the handle so that the light-emitting portion is visible through the aperture.

* * * * *